United States Patent
Paller et al.

(10) Patent No.: US 10,150,189 B2
(45) Date of Patent: Dec. 11, 2018

(54) CONDENSATE TRAP FOR HEATING-COOLING SYSTEMS

(71) Applicant: Lennox Industries Inc., Richardson, TX (US)

(72) Inventors: Hans J. Paller, Double Oak, TX (US); Glenn W. Kowald, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 15/599,594

(22) Filed: May 19, 2017

(65) Prior Publication Data

US 2017/0254563 A1    Sep. 7, 2017

Related U.S. Application Data

(62) Division of application No. 14/921,820, filed on Oct. 23, 2015, now Pat. No. 9,657,964, which is a division
(Continued)

(51) Int. Cl.
*B29C 45/18* (2006.01)
*F23D 14/34* (2006.01)
(Continued)

(52) U.S. Cl.
CPC ............. *B23P 15/00* (2013.01); *B29C 45/18* (2013.01); *F23D 14/34* (2013.01); *F23D 14/58* (2013.01);
(Continued)

(58) Field of Classification Search
CPC ....... F16T 1/34; F16T 1/38; F16T 1/48; F16T 1/22; E03B 7/095; G05D 9/02;
(Continued)

(56) References Cited

U.S. PATENT DOCUMENTS 4,479,482 A    10/1984 Cherington
4,502,500 A    3/1985 Upton
(Continued)

FOREIGN PATENT DOCUMENTS

WO    2007135430 A2    11/2007

*Primary Examiner* — Jianying Atkisson
*Assistant Examiner* — Meraj A Shaikh
(74) *Attorney, Agent, or Firm* — Hubbard Johnston, PLLC

(57) ABSTRACT

A condensation trap comprising an inlet chamber, a vent chamber and an outlet chamber. The inlet chamber is configured to receive condensate fluid through an external opening therein. The vent chamber is in fluid communication with the inlet chamber via a first passageway that includes an internal opening of the inlet chamber. The internal opening is located substantially at an opposite end of the vent chamber as the external opening. The outlet chamber is in fluid communication with the vent chamber via a second passageway that includes an internal opening in a sidewall of the vent chamber and an interior opening in an end of the outlet chamber. The outlet chamber is configured to transmit the condensate fluid through an exterior opening located at an opposite end of the outlet chamber. A vent volume portion is greater than a total volume of an internal space of the inlet chamber.

3 Claims, 8 Drawing Sheets

Related U.S. Application Data of application No. 12/834,138, filed on Jul. 12, 2010, now Pat. No. 9,170,029.

(60) Provisional application No. 61/295,501, filed on Jan. 15, 2010.

(51) Int. Cl.

| | | |
|---|---|---|
| *B23P 15/00* | (2006.01) | |
| *F23D 14/58* | (2006.01) | |
| *F24H 3/08* | (2006.01) | |
| *F24H 8/00* | (2006.01) | |
| *F25D 21/14* | (2006.01) | |
| *F24H 9/20* | (2006.01) | |
| *B29L 31/18* | (2006.01) | |

(52) U.S. Cl.
CPC ............ *F24H 3/087* (2013.01); *F24H 8/006* (2013.01); *F24H 9/2035* (2013.01); *F25D 21/14* (2013.01); *B29L 2031/18* (2013.01); *F23D 2900/14481* (2013.01); *Y02B 30/106* (2013.01); *Y10T 29/49* (2015.01); *Y10T 29/4935* (2015.01); *Y10T 29/49348* (2015.01); *Y10T 29/49389* (2015.01); *Y10T 29/49826* (2015.01); *Y10T 137/4463* (2015.04)

(58) Field of Classification Search
CPC ....... E03F 5/0405; E03F 5/042; E03F 5/0406; E03F 2005/0416; E03C 1/288; E03C 1/284; E03C 1/294; E03C 1/23; E03C 1/2302; E03C 1/292; F24H 8/006; F25D 21/14; Y10T 137/3068; B29C 45/18
USPC .......... 236/41, 56, 59, 60; 137/171, 197, 59, 137/247.1, 247.21, 247.11, 203; 62/55.5, 62/503; 126/110 R, 116 R
See application file for complete search history.

(56) References Cited

U.S. PATENT DOCUMENTS

| | | | | |
|---|---|---|---|---|
| 4,682,579 | A | 7/1987 | Bigham | |
| 5,704,343 | A | 1/1998 | Ahn | |
| 6,651,272 | B2* | 11/2003 | Bowman | B01D 61/10 285/132.1 |
| 6,845,527 | B1* | 1/2005 | Kohn | E03C 1/12 137/247.41 |
| 7,036,498 | B2* | 5/2006 | Riepenhoff | F24H 8/006 126/110 R |
| 7,823,601 | B2* | 11/2010 | Nishimoto | E03C 1/288 137/247.21 |
| 7,931,046 | B1* | 4/2011 | Vallery | F16T 1/30 137/185 |
| 7,976,701 | B2* | 7/2011 | Nishimoto | E03C 1/288 137/247.21 |
| 2007/0026096 | A1* | 2/2007 | Takatsugi | B29C 45/18 425/147 |
| 2007/0151604 | A1* | 7/2007 | Platusich | F16T 1/14 137/178 |
| 2008/0017250 | A1* | 1/2008 | Butler | E03B 1/04 137/247.13 |
| 2008/0314375 | A1* | 12/2008 | Khan | F24H 3/087 126/116 R |
| 2009/0056346 | A1* | 3/2009 | Zatarain | F25D 21/14 62/55.5 |
| 2011/0036417 | A1* | 2/2011 | McAlpine | E03C 1/29 137/247.13 |

* cited by examiner

CONDENSATE TRAP FOR HEATING-COOLING SYSTEMS

CROSS REFERENCE TO RELATED INFORMATION

This application is a divisional of U.S. patent application Ser. No. 14/921,820, filed Oct. 23, 2015, now U.S. Pat. No. 9,657,964, which is a divisional of U.S. patent application Ser. No. 12/834,138, now U.S. Pat. No. 9,170,029, filed Jul. 12, 2010, titled "Condensate Trap for Heating-Cooling Systems", which claims the benefit of U.S. Provisional Patent Application No. 61/295,501, filed Jan. 15, 2010, the contents of which are hereby incorporated herein in its entirety.

TECHNICAL FIELD

This application is directed, in general, to heating-cooling systems, and more specifically, to removing condensation from such systems.

BACKGROUND OF THE INVENTION

Heating-cooling systems, such as heating, ventilating and air conditioning (HVAC) systems often include a furnace and heat exchanger to heat the air circulated by the system. As air flows through the system, condensation can form. Water condensate can potentially cause the malfunction of, or damage to, components of the system, and therefore it is desirable to remove condensate from the system. Typically, a condensate box and trap are provided to facilitate the draining of condensation fluids from furnace components through which products of combustion are exhausted from the furnace, such as header boxes and exhaust vents.

In some systems, an increase in furnace vent lengths means the trap has to operate under conditions where the atmospheric pressure on the trap undergoes large changes when a furnace transitions between a neutral or "off" state to an operating or "on" state. Additionally, some furnace condensate traps designs can have two or more input connection points and can have a large internal volume. Such design features tend to increase the minimum size of the trap, which in turn, undesirably reduces installation flexibility.

BRIEF SUMMARY OF THE INVENTION

One embodiment of the present disclosure is a condensation trap comprising an inlet chamber, a vent chamber and an outlet chamber. The inlet chamber is configured to receive condensate fluid through an external opening therein. The vent chamber is in fluid communication with the inlet chamber via a first passageway that includes an internal opening of the inlet chamber. The internal opening is located substantially at an opposite end of the vent chamber as the external opening. The outlet chamber is in fluid communication with the vent chamber via a second passageway that includes an internal opening in a sidewall of the vent chamber and an interior opening in an end of the outlet chamber. The outlet chamber is configured to transmit the condensate fluid through an exterior opening located at an opposite end of the outlet chamber. A vent volume portion, which includes an internal space of the vent chamber that is below the exterior opening, is greater than a total volume of an internal space of the inlet chamber.

Another embodiment of the present disclosure is a condensation management system. The system comprises a condensation collection box configured to collect condensate fluid. The system also comprises a transfer hose having one end coupled to the condensation collection box and the above-described a condensation trap. The inlet chamber configured to receive the condensate fluid through an external opening coupled an opposite end of the transfer hose.

Another embodiment of the present disclosure is a method of manufacturing the above-described condensation trap. The method comprises providing a mold, the mold defining an enclosed cavity that includes spaces to accommodate, the inlet chamber, the vent chamber, and the outlet chamber as described above. The method also comprises introducing a moldable material into the mold, allowing the allowing the moldable material to solidify to a casting, and removing the casting from the mold to provide the condensation trap.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

One embodiment of the present disclosure is a condensation trap. One feature of the disclosed trap is an internal vent volume portion that is larger than an inlet chamber internal volume. As further discussed below such a feature facilitates the trap's ability to accommodate certain inlet pressures without causing the trap to lose its prime, while also facilitating a compact trap design.

Figure 1:
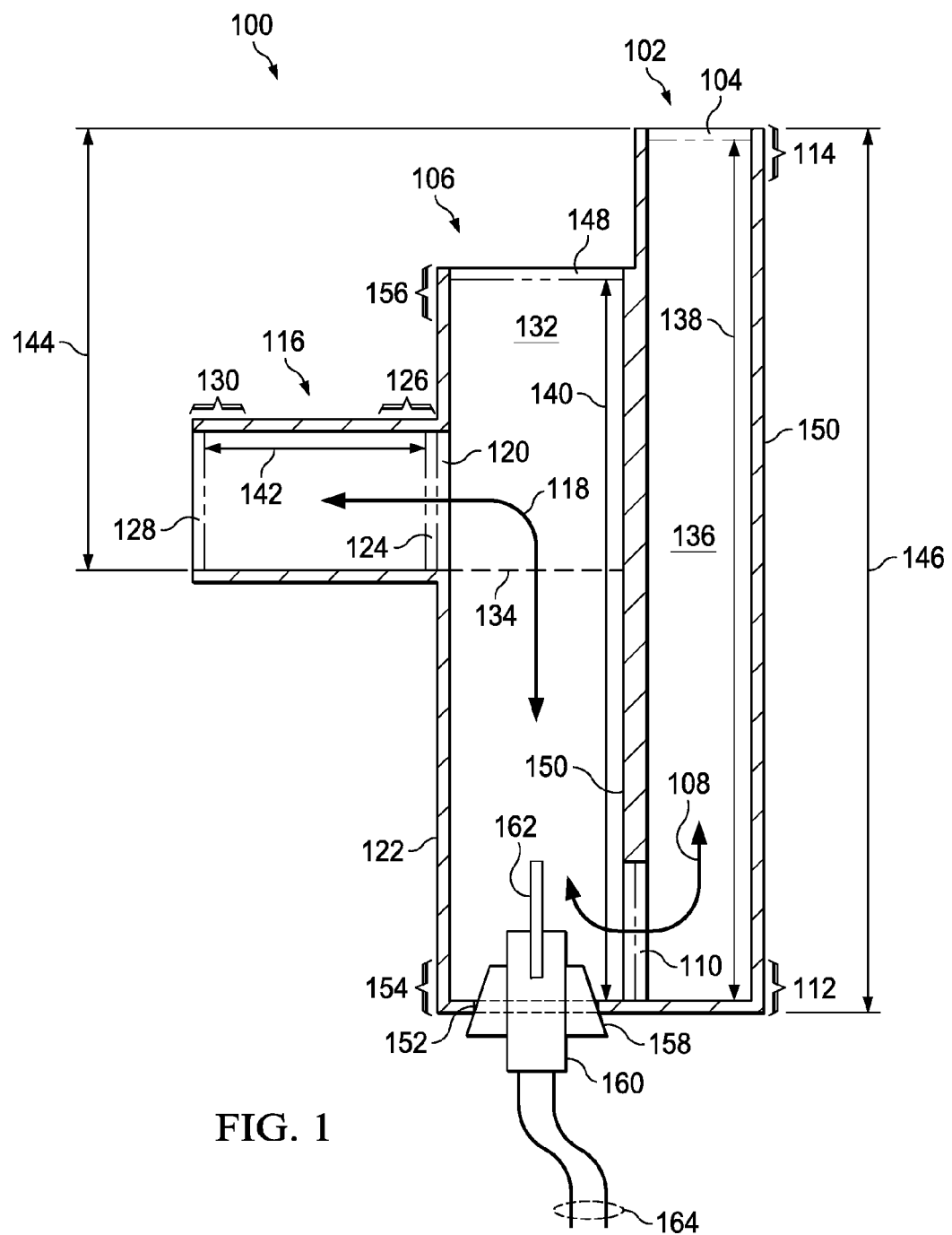
FIG. 1 presents a cross-sectional view of an example embodiment of a condensation trap of the disclosure.
Figure 2A:
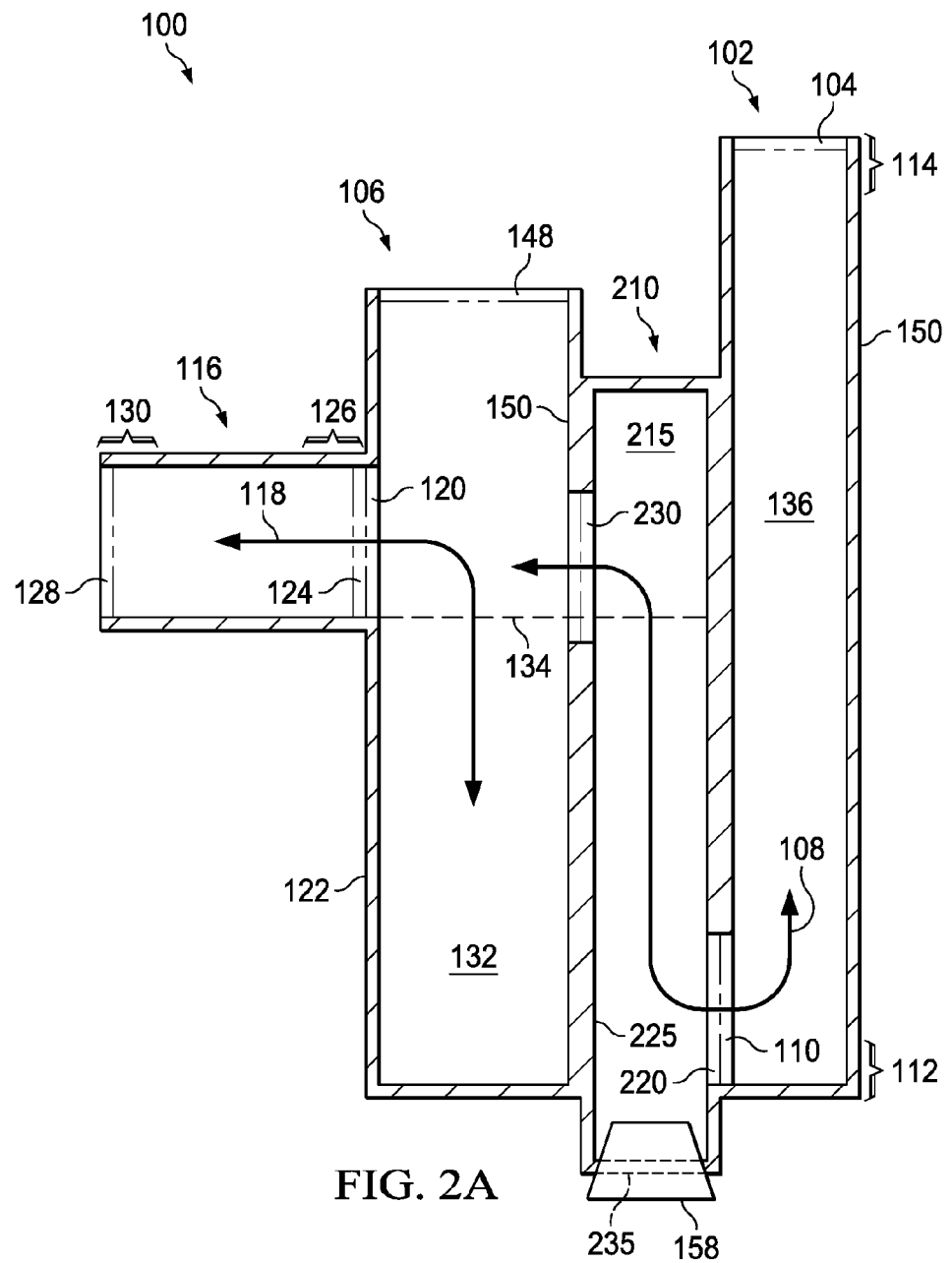
FIGS. 2A and 2B presents a cross-sectional views of other example embodiments of a condensation trap of the disclosure.
Figure 2B:
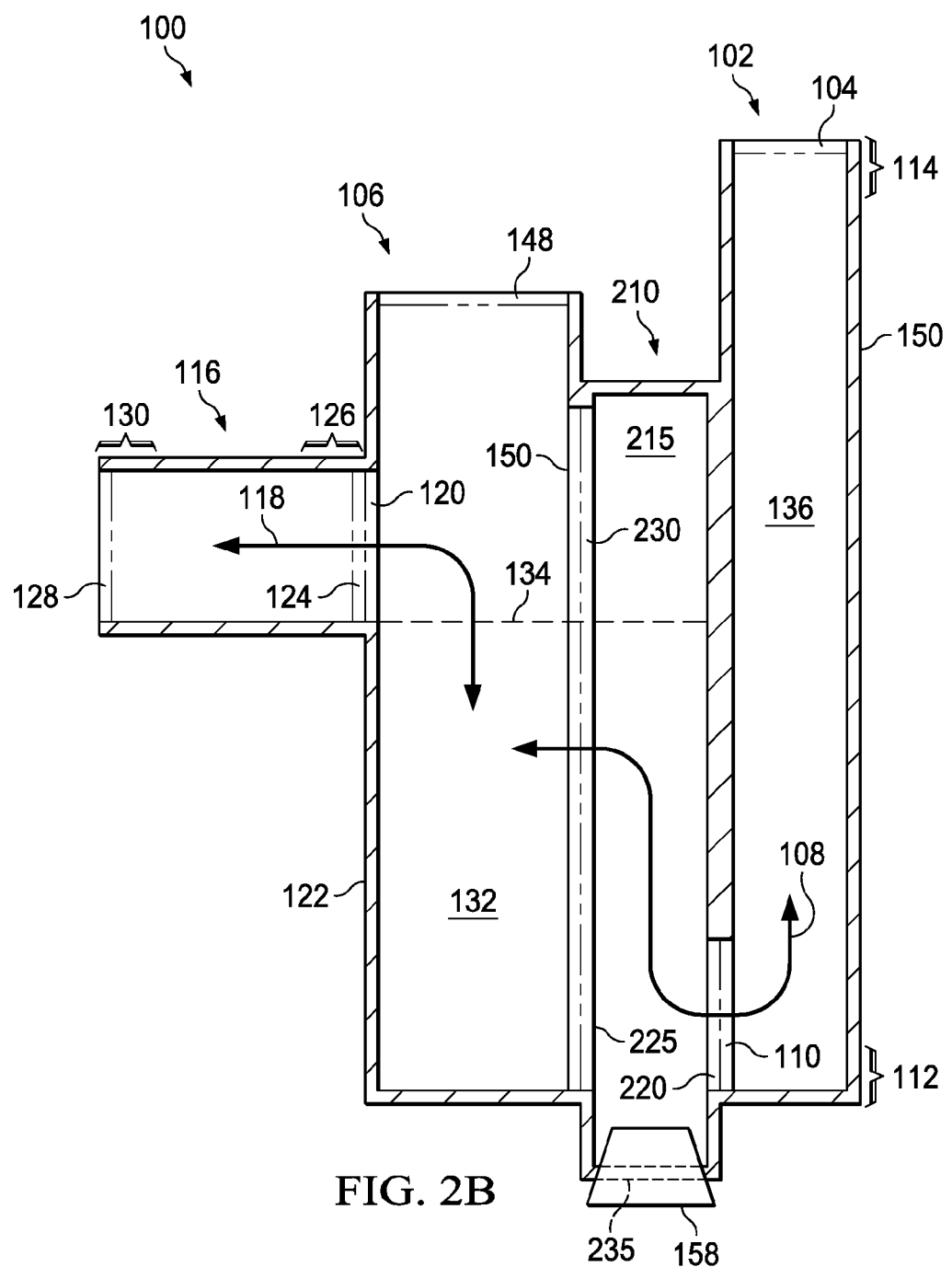

FIG. 1 presents a cross-sectional view of an example embodiment of a condensation trap 100 of the disclosure. FIG. 2A and 2B present cross-sectional views of other example embodiments of a condensation trap 100 of the disclosure.

Turning to FIG. 1, the trap 100 comprises an inlet chamber 102 configured to receive condensate fluid (not shown) through an external opening 104 therein. The trap 100 also comprises a vent chamber 106 in fluid communication with the inlet chamber 102 via a first passageway 108. The first passageway 108 includes an internal opening 110 of the inlet chamber 102. The internal opening 110 is located substantially at an opposite end 112 of the inlet chamber 102 at an end 114 of the chamber 105 where the external opening 104 is located. The trap 100 further comprises an outlet chamber 116 in fluid communication with the vent chamber 106 via a second passageway 118 that includes an internal opening 120 in a sidewall 122 of the vent chamber 106 and also includes an interior opening 124 at an end 126 of the outlet chamber 116. The outlet chamber 116 is configured to transmit the condensate fluid through an exterior opening 128 at an opposite end 130 of the outlet chamber 116. A vent volume portion of the trap 100, which includes an internal space 132 of the vent chamber 106 that is below the exterior opening 128 (e.g., below a high fluid mark 134 for the embodiment in FIG. 1 after which fluid accumulation get transmitted into the outlet chamber 116), is greater than a total volume of an internal space 136 of the inlet chamber 102.

The term fluid communication, as used herein, means that a fluid in the internal space of one chamber can be transmitted via a passageway to another communicating chamber. E.g., a condensate fluid in inlet chamber 102 can flow into the vent chamber 106 via the pathway 108. E.g., a condensate fluid in the vent chamber 106 can flow into the outlet chamber 116 via the pathway 118.

In some embodiments of the trap 100, such as shown in FIG. 1, to facilitate a compact trap design, a major dimension 138 of the inlet chamber 102 and a major dimension 140 of the vent chamber 106 are substantially parallel to each other. E.g., in some cases, the dimensions 138, 140 forms a divergent angle of about 0±20 degrees. As further illustrated, in some embodiments, to facilitate the drainage of condensate fluid out of the outlet chamber (e.g., gravity drainage), a major dimension 142 of the outlet chamber 116 is substantially perpendicular to the major dimension 140 of the vent chamber 106. E.g., in some cases the major dimensions 140, 142 forms a divergent angle of about 90±20 degrees.

Figure 4A:
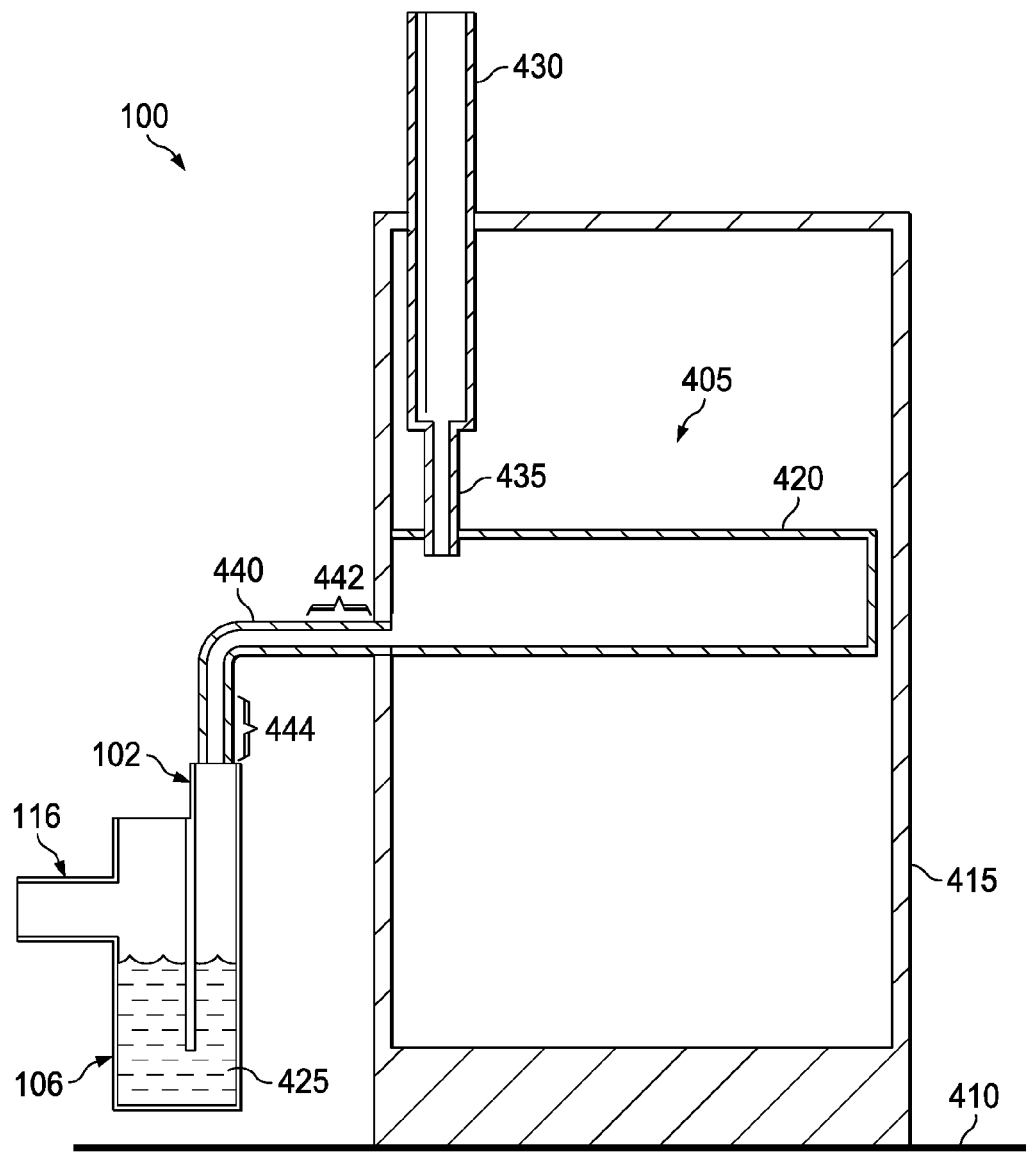
FIG. 4A-4C presents a cross-sectional view of selected features of a condensation management system of the disclosure which includes an example condensation trap of the disclosure depicted in different operational states of the system.

As further illustrated in FIG. 1, in some embodiments, when the condensation trap 100 is positioned in a condensation management system 405 (e.g., FIG. 4A), to facilitate the capture and retention of condensate fluid, the major dimension 138 of the inlet chamber 102 and the major dimension 140 of the vent chamber 106 are substantially vertically oriented. And, to facilitate draining the condensate fluid, the major dimension 142 of the outlet chamber 128 is substantially horizontally oriented. E.g., inlet chamber 102 and vent chamber 106 the major dimensions 138, 140 are substantially perpendicular (e.g., forming an incident angle of 90±20 degree) with respect to a floor or mounting base 410 that supports a furnace 415 that the condensation management system 405 is part of (FIG. 4A). E.g., the outlet chamber 116 major dimension 142 is substantially parallel (e.g., forming an incident angle of 0±20 degree) with respect to the floor or base.

As also illustrated in FIG. 1, in some embodiments, when the condensation trap 100 is positioned in a condensation management system 405 (FIG. 4A), to facilitate fluid drainage, the inlet chamber external opening 104 is vertical raised above the outlet chamber exterior opening 128. The difference in height 144 between the inlet chamber external opening 104 is vertical raised above the outlet chamber exterior opening 128 would depend upon an number of factors including the ranges of pressures at the inlet opening 104, the ratio of the vent volume portion to the total volume of the inlet chamber internal space 136. For instance, in some embodiments when the ratio of the vent volume portion to the total volume is in a range of about 4:1 to 5:1. The difference in height 144 can be about 5 inches.

Such features are conducive to providing a compact trap design that is able to drain condensate fluid to the exterior opening 128 of the outlet chamber 116 against a negative pressure at the external opening 104 of the inlet chamber 102. E.g., in some embodiments there can be a negative pressure at the external opening 104 that corresponds to a −5 inch column of water at standard conditions of 20° C. and 1 atmosphere of pressure. E.g., in some embodiments, a major dimension length 146 of the trap 100 is about 7 inches or less.

As also depicted in FIG. 1, the vent chamber 106 is in communication with the ambient atmosphere via an exterior vent opening 148 of the vent chamber 106. In some embodiments, a cross-sectional area of the exterior vent opening 148 in the vent chamber 106 is greater than a cross-sectional area of the inlet chamber external opening 104. In some embodiments, such a configuration is conducive to providing a vent volume portion (e.g., internal space 132) of the vent chamber 106 that is greater than the total volume of the input chamber 102 (e.g., internal space 136) as discussed above and to reducing the overall height 146 of the trap 100 and thereby facilitate the trap 100 readily fitting into the small confines of a heating-cooling system (e.g., a furnace housing). Such can be the case, for instance, when the side walls 122 of the vent chamber 106 and the side walls 150 of the input chamber 102 are straight walls. In such embodiments, the cross-sectional areas of the exterior opening 148 and inlet chamber external opening 104 can be geometrically related to the vent volume portion of the vent chamber 106 and the total volume of the input chamber 102, respectively. For instance, in some embodiments the ratio of the cross-sectional areas of the exterior vent opening 148 to the inlet chamber external opening 104 equals about 2:1.

As further depicted in FIG. 1, in some cases, the inlet chamber 102 and the vent chamber 106 are in direct fluid communication via the first passageway 108 which further includes an interior opening 150 in the vent chamber 106 that is substantially concentric with the internal opening 110 in the inlet chamber 102.

As also illustrated in FIG. 1, in some embodiments, the vent chamber 106 can further include another exterior opening 152 on an opposite end 154 of the vent chamber 106 as the end 156 where the exterior vent opening 148 is located. The exterior opening 152 is configured to hold removable plug 158 therein. The exterior opening 152 can serve as a clean-out port, e.g., to facilitate periodic cleaning of the inside of the traps 100 of debris which may build-up in the trap 100 and block the flow of condensate fluid through. In some cases, the plug 158 can include a freeze preventer device 160. In other cases, however, the freeze preventer device 160 can be installed in the trap independently of the plug 158. Embodiments of the freeze preventer device 160 can include one or more resistive heating elements 162 configured to apply heat (e.g., via an electrical current applied to the elements 162 via leads 164) when the inside of the trap 100 is exposed to near-freezing temperatures, such as the case when the trap 100 is installed in an unconditioned space. A built-in freeze preventer device 160 to prevent freezing can advantageously avoid the need to wrap electric heating tape around the trap 100 to prevent freezing.

As illustrated in FIGS. 2A and 2B, in some embodiments, the wherein said fluid communication from said inlet chamber 102 to the vent chamber 106 further includes an intermediate chamber 210 located between the inlet chamber 102 and the vent chamber 106. An internal space 215 of the intermediate chamber 210 located below the outlet exterior opening 116 is part of the vent volume portion. For example, the vent volume portion includes the internal space 132 of the vent chamber 106 and internal space 215 of the intermediate chamber 210 that is below the exterior opening 120 (e.g., below the high fluid mark 134).

In some cases, the inclusion of the intermediate chamber 210 facilitates the manufacture of the condensation trap 100, e.g., by simplifying an injection molding process used to form the interconnected chambers 102, 106, 116, 210 and can allow the use or standard tubing sizes to facilitate attaching the trap to other components of a condensation management system.

As further illustrated in FIG. 2A, in some embodiments of the trap 100, the intermediate chamber 210 can include an interior opening 220 that is substantially concentric with the inlet chamber internal opening 110, and, an interior sidewall 225 opening 230 that is substantially concentric with an interior opening in sidewall 150 of the vent chamber 106. In some cases, the inlet chamber internal opening 110 and interior sidewall 225 opening 230 can also be concentric with the outlet interior opening 124. However, in some embodiments such as illustrated in FIG. 2B, there may be substantially no sidewalls that separate the vent chamber 106 from the intermediate chamber 210. For the example, the interior opening in sidewall 150 of the vent chamber 106 and the interior sidewall 225 opening 230 of the intermediate chamber 210 can include substantially all of portions of these two chambers 106, 210 that overlap in the trap 100.

As further illustrated in FIGS. 2A and 2B, in some embodiments, the intermediate chamber 210 further includes an external opening 235 on an opposite side of the trap 100 as the inlet chamber external opening 104. In certain embodiments, an intermediate chamber 210 external opening 235 can be configured to hold a removable plug 158 or freeze preventer device 160, similar to (or in addition to) that described for the exterior opening 152 of the vent chamber 106 in the context of FIG. 1.

Figure 3:
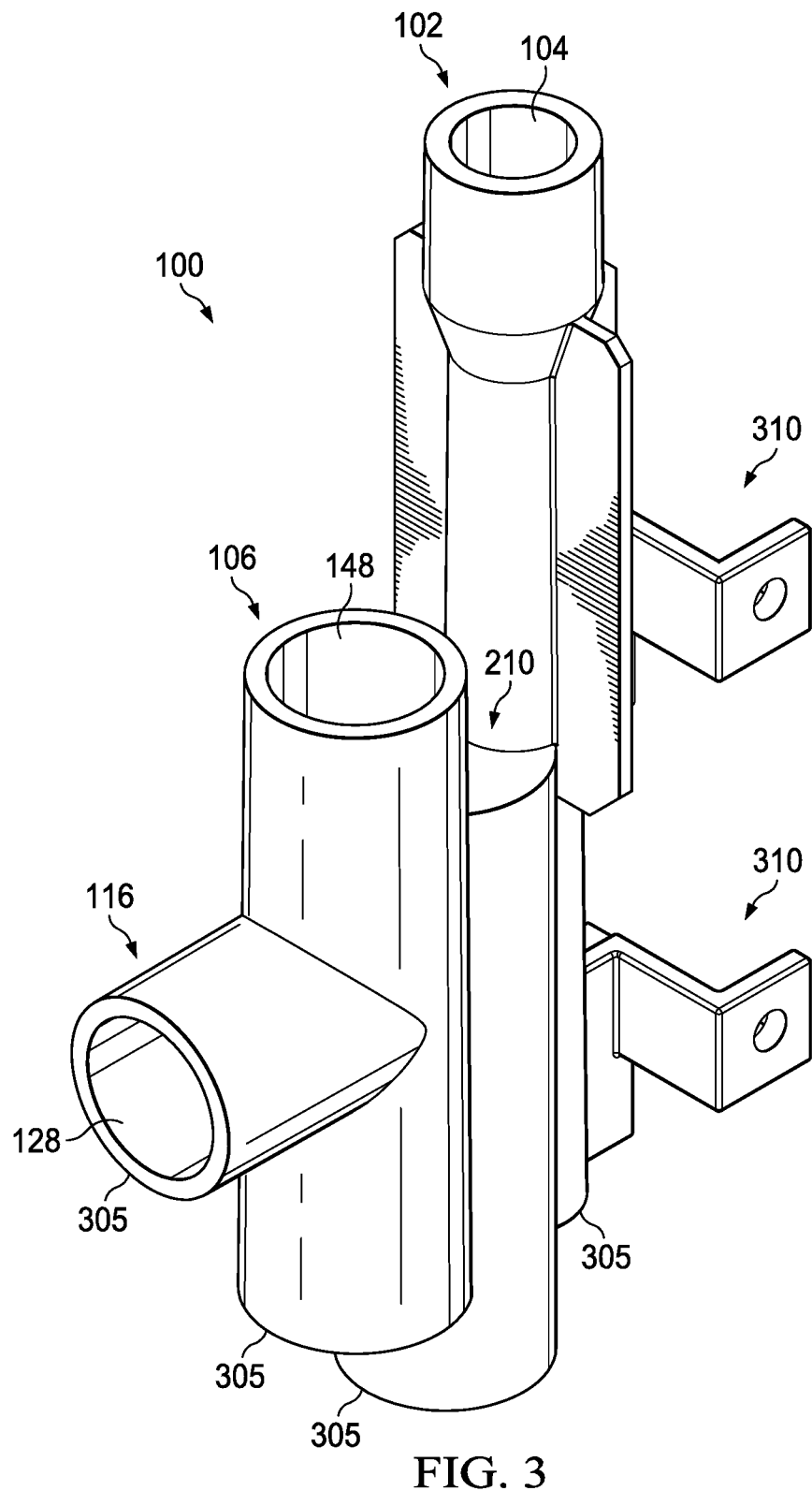
FIG. 3 presents a perspective view of an example condensation trap of the disclosure analogous to that depicted in FIG. 2A or 2B.

FIG. 3 presents a perspective view of an example condensation trap 100 of the disclosure that is analogous to that depicted in FIGS. 2A or 2B. As illustrated, in some embodiments of the trap 100, one or more of the inlet chamber 102, the vent chamber 106, the outlet chamber 116, or optional intermediate chamber 210, can be substantially cylindrically-shaped. For instance, in some embodiments, the cylindrically-shaped chambers 102, 106, 116, 210 can correspond to standardized sizes of tubing (e.g., polyvinyl chloride, PVC, tubing having a ¾ inch outer diameter and ½ inch inner diameter) commonly used in the heating-cooling industry facilitate coupling to other components of a condensation management system.

As further illustrated in FIG. 3 embodiments of the trap 100 can be a unitary body, such that walls 305 of the chambers 102, 106, 116, 210 are composed of a same material (e.g., PVC) formed in a single-step injection molding process. In some cases, the trap 100 can further include one or more mounting bodies 310 to facilitate attachment of the trap 100 to other components of a condensation management system, or other components of a heating cooling system. In some embodiments, the mounting bodies 310 are part of the same unitary body the chamber walls are composed of.

Figure 4B:
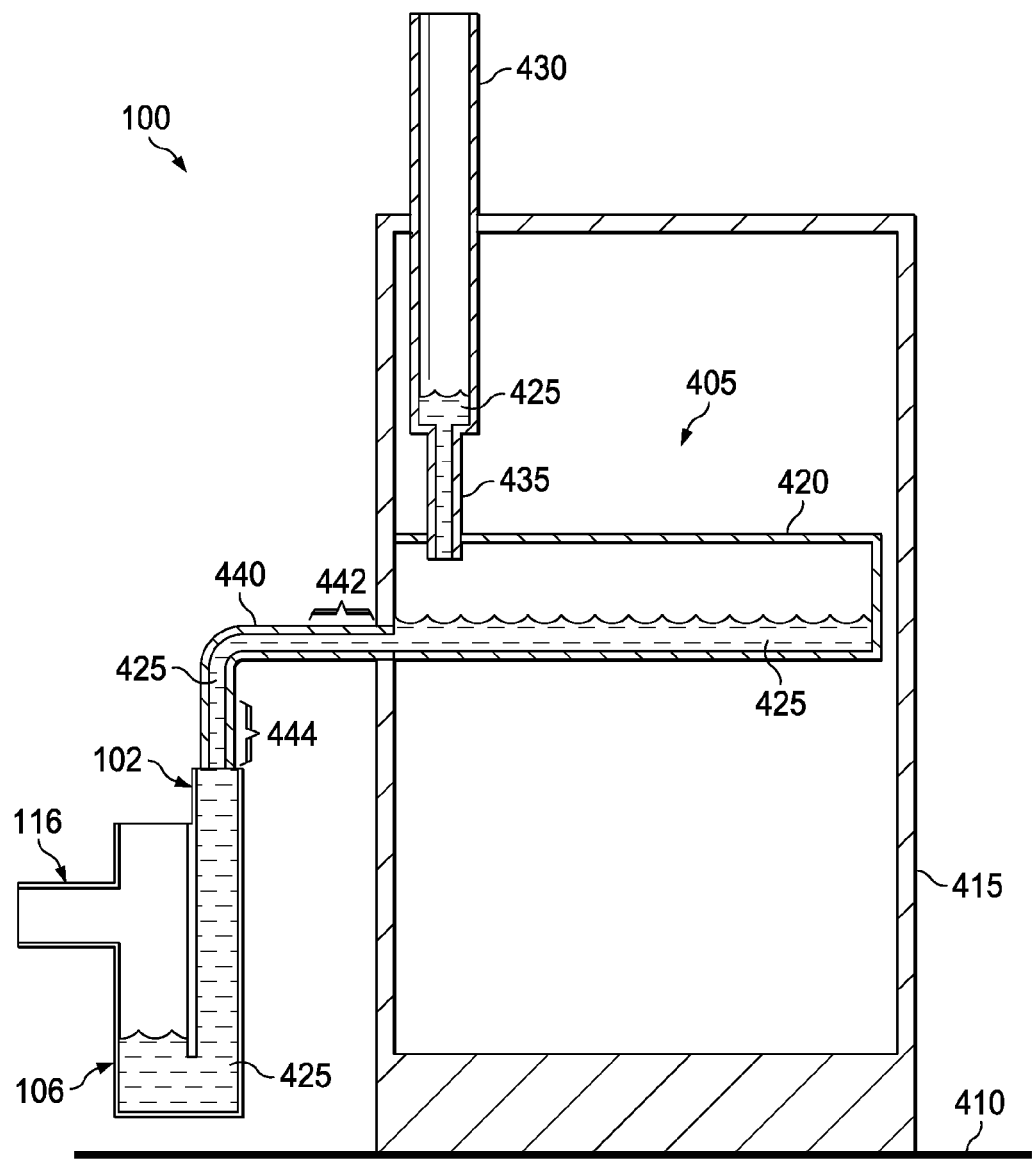
Figure 4C:
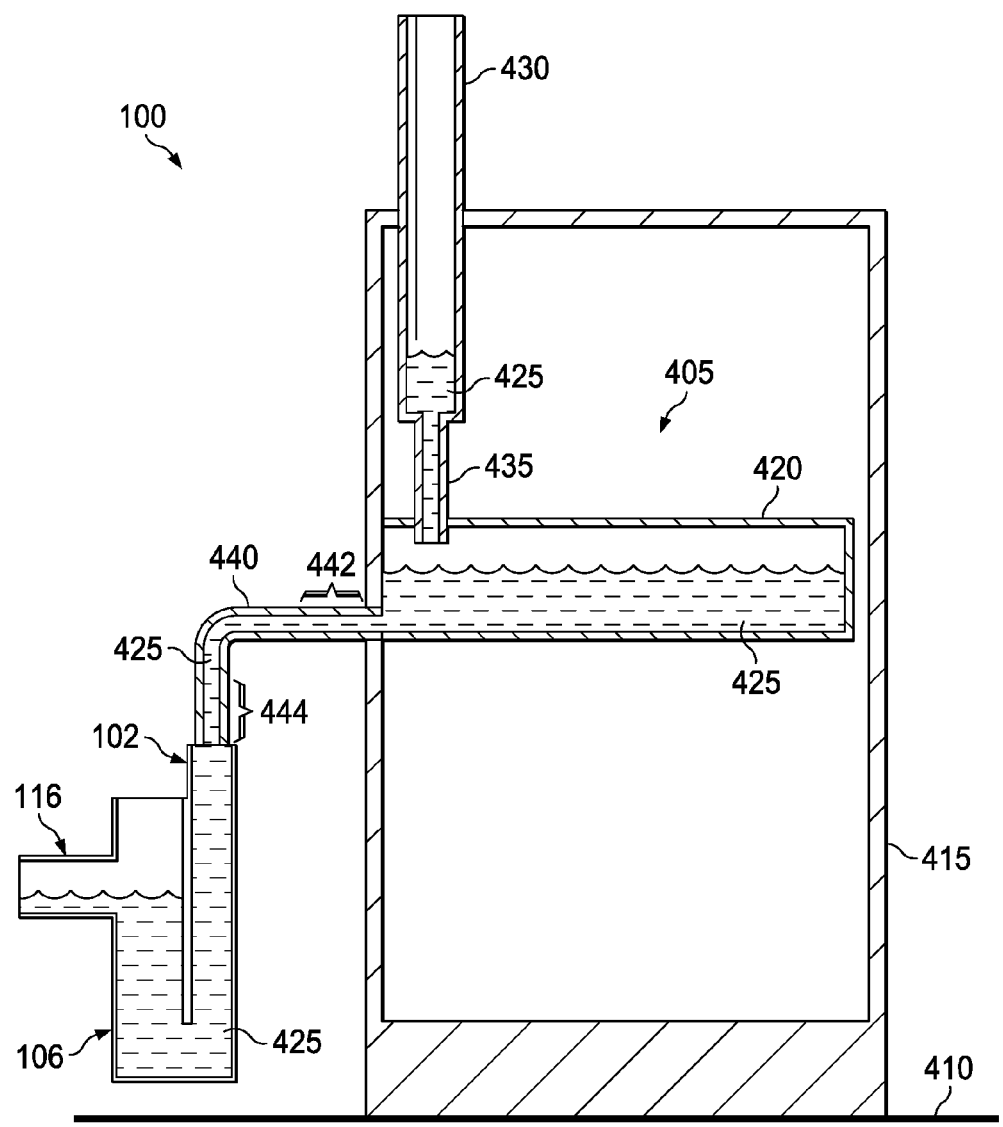

Another embodiment of the present disclosure is condensation management system that comprises the condensation trap disclosed herein. FIG. 4A-4C presents a cross-sectional view of selected features of a condensation management system 405 of the disclosure which includes an example condensation trap 100 of the disclosure. The example trap 100 is depicted in different operational states of the system 400 in each of FIGS. 4A, 4B and 4C. In some embodiments, the condensation management system 405 is incorporated into a component of a heating-cooling system 400 such as a furnace 415.

As illustrated, the condensation management system 405 comprises a condensation collection box 420 configured to collect condensate fluid 425. For instance, condensate fluid 425 collected in one or more flues pipe 430 of the furnace 415 can be coupled to the collection box 420 via one or more flue hoses 435.

The system 405 also comprises a transfer hose 440 having one end 442 coupled to the condensation collection box 420 and another end 444 coupled to the trap 100. The condensation trap 100 comprises the inlet chamber 102, vent chamber 106, and outlet chamber 116 such as described above, and can further include other features such as discussed above in the context of FIGS. 1-3. The other end 444 of the transfer hose 430 is coupled to the inlet exterior opening 104 of the trap 100 (FIG. 1).

In some preferred embodiments, the trap 100 is optimized for use in a negative-pressure only condensation management system 405. That is, when in operation, the condensation collection box 420 is configured to generate only a negative pressure, which in turn, causes a negative pressure (relative to the ambient atmospheric pressure) at the exterior opening 104 coupled to the box 420. When not in operation, the pressure of the condensation collection box 420 and at the exterior opening 104 is neutral (relative to the ambient atmospheric pressure). This is in contrast to some condensation management systems which are configured to deal both vent draining and condensation collection box draining that generate a positive and negative pressure at its condensation collection box at different stages of operation.

For instance, FIG. 4A shows the condensation management system 405 when it is not in operation and the pressure in the condensation collection box 420 and at the exterior opening 104 is substantially neutral. In such a state, the condensate fluid 425 levels in the trap 100 are substantially the same in the inlet chamber 102 and the vent chamber 106. FIG. 4B shows the condensation management system 405 when in an initial stage of operation. The condensation collection box 420 generates a negative pressure, and, the corresponding negative pressure at the exterior opening 104 of the inlet chamber 102, causes condensate fluid 425 in the trap 100 to move from the vent chamber 106 to the inlet chamber 102. However, due to the vent volume portion being larger than the inlet chamber's 102 internal total volume the vent chamber 106 is not fully depleted of condensate fluid 425 during this operational state. Based on the present disclosure one of ordinary skill in the art would understand how to adjust the relative sizes of the vent volume portion and inlet internal total volume to accommodate various negative pressures at the exterior opening 104. FIG. 4C shows the condensation management system 405 when in a latter stage of operation. As condensate fluid 425 accumulates in the system 405 the condensate fluid 425 drains from the condensation collection box 420 to the trap 100 and out of the outlet chamber 116.

Figure 5:
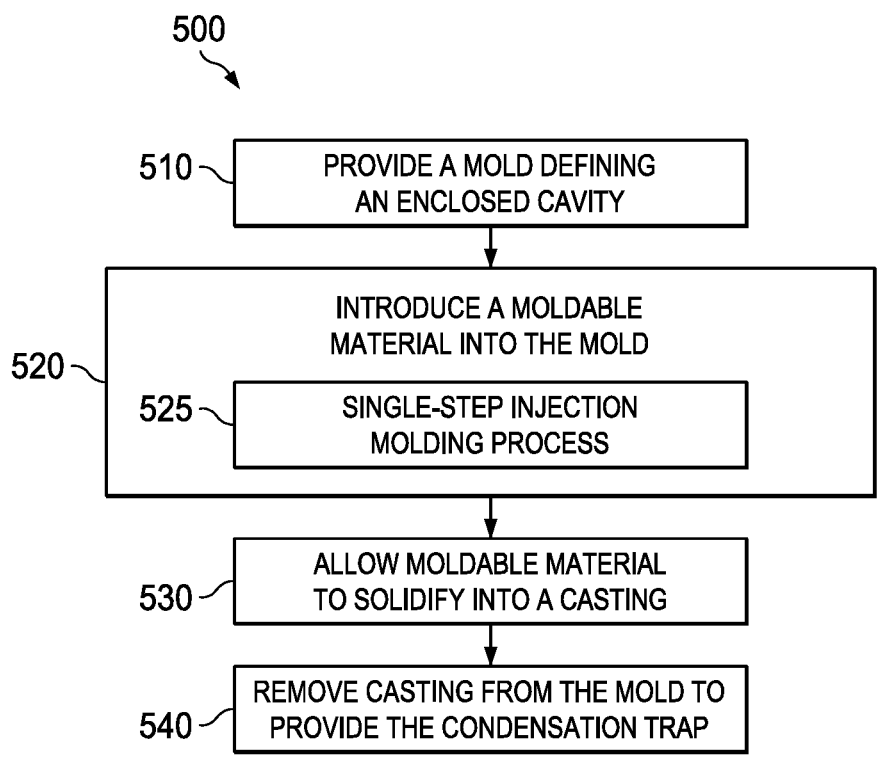
FIG. 5 presents a flow diagram of an example method of manufacturing a condensation trap of the disclosure, such as any of the example traps depicted in FIGS. 1-4C.

Another embodiment of the present disclosure is a method of manufacturing a condensation trap. FIG. 5 presents a flow diagram of an example method 500 of manufacturing a condensation trap of the disclosure, such as any of the embodiments of the traps 100 discussed in the context of FIGS. 1-4C, certain components of which are referred to throughout below.

The method 500 comprises a step 510 of providing a mold that defines an enclosed cavity that defines the trap structure. The enclosed cavity includes the inlet chamber 102, vent chamber 106 and outlet chamber 116 configured as described above in the context of FIGS. 1-4C. One of ordinary skill in the art would understand how to fabricate such molds, e.g., by machining and including internal inserts as needed to define the chambers 102, 106, 116 and other structures of the trap 100.

The method 500 further comprises a step 520 of introducing a moldable material into the mold. In some embodiments for instance a moldable material comprising a polymer powder (e.g., PVC power or PVC powder alloyed with other polymers or plasticizers) can be heated and mixed to a homogenous flowable state and then introduced into the mold in accordance with step 520 by transferring the moldable material into the enclosed cavity. In some preferred embodiments, the introduction step 520 can further include a single-step injection-mold process 525. The single-step injection molding process (step 525) can provide substantial time and cost savings as compared to alternative processes where, e.g., individual parts of the trap are individually molded and then glued or fitted together.

The method 500 further comprises a step 530 of allowing the moldable material to solidify into a casting, and, a step 540 of removing the casting from the mold to provide the condensation trap.

Those skilled in the art to which this application relates will appreciate that other and further additions, deletions, substitutions and modifications may be made to the described embodiments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of manufacturing a condensation trap, comprising:
    providing a mold, said mold defining an enclosed cavity that includes spaces that define the condensation trap having:
        an inlet chamber configured to receive condensate fluid through an external opening therein,
        an vent chamber in fluid communication with said inlet chamber via a first passageway that includes an internal opening of said inlet chamber, said internal opening located substantially on an opposite end from said external opening, wherein the vent chamber shares a common sidewall with the inlet chamber,
        an outlet chamber coupled to said vent chamber via a second passageway that includes an internal opening in a sidewall of said vent chamber and an interior opening in an end of said outlet chamber, said outlet chamber configured to transmit said condensate fluid through an exterior opening in an opposite end of said outlet chamber, and
        wherein a vent volume portion, which includes an internal space of said vent chamber that is below said exterior opening, is greater than a total volume of said inlet chamber;
    introducing a moldable material into said mold;
    allowing said moldable material to solidify to a casting; and
    removing said casting from said mold to provide said condensation trap.

2. The method of claim 1, wherein introducing said moldable material includes a single-step injection-molding process.

3. The method of claim 1, wherein the enclosed cavity that includes spaces that define the condensation trap further includes an intermediate chamber located between said inlet chamber and said vent chamber, wherein an internal space of said intermediate chamber located below said exterior opening is part of said vent volume portion, and wherein said fluid communication from said inlet chamber to said vent chamber includes said intermediate chamber.

* * * * *